United States Patent
Kumashio

(10) Patent No.: US 7,701,599 B2
(45) Date of Patent: Apr. 20, 2010

(54) SETTING ERROR AVOIDABLE PRINTING SYSTEM AND METHOD

(75) Inventor: Hiroya Kumashio, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 1063 days.

(21) Appl. No.: 10/051,278

(22) Filed: Jan. 22, 2002

(65) Prior Publication Data

US 2002/0097432 A1 Jul. 25, 2002

(30) Foreign Application Priority Data

Jan. 19, 2001 (JP) .............................. 2001-011294

(51) Int. Cl.
*G06F 3/12* (2006.01)

(52) U.S. Cl. ...................... 358/1.15; 358/1.9; 358/1.14; 358/1.16; 709/201; 709/202; 709/203

(58) Field of Classification Search ................ 358/1.15, 358/1.14, 402, 403, 407, 442, 1.9, 1.16; 709/203, 709/216, 217, 219, 221, 228, 201, 202
See application file for complete search history.

(56) References Cited

U.S. PATENT DOCUMENTS

| 5,241,464 | A | * | 8/1993 | Greulich et al. ................ 705/26 |
| 5,625,757 | A | * | 4/1997 | Kageyama et al. ......... 358/1.14 |
| 5,666,139 | A | * | 9/1997 | Thielens et al. ............. 345/173 |
| 6,134,568 | A | * | 10/2000 | Tonkin ....................... 715/526 |
| 6,335,795 | B1 | * | 1/2002 | Neuhard et al. ............ 358/1.15 |
| 6,348,971 | B2 | * | 2/2002 | Owa et al. ................. 358/1.15 |
| 6,384,926 | B2 | * | 5/2002 | Mochizuki ................ 358/1.15 |
| 6,614,550 | B1 | * | 9/2003 | Minagawa ................ 358/1.15 |
| 6,661,531 | B1 | * | 12/2003 | Murphy et al. ............. 358/1.15 |
| 6,842,766 | B2 | * | 1/2005 | Brockway et al. ........... 709/203 |
| 6,864,993 | B1 | * | 3/2005 | Roberts et al. ............... 358/1.9 |
| 6,897,972 | B1 | * | 5/2005 | Noda ........................ 358/1.15 |
| 6,934,046 | B1 | * | 8/2005 | Nishikawa et al. ......... 358/1.15 |
| 6,955,253 | B1 | * | 10/2005 | Mazur et al. ................ 194/207 |
| 6,975,417 | B1 | * | 12/2005 | Hilpl et al. ................. 358/1.15 |

FOREIGN PATENT DOCUMENTS

| JP | 11-180011 | 7/1999 |
| JP | 11-272435 | 10/1999 |
| JP | 11-331102 | 11/1999 |
| JP | 2000-227847 | 8/2000 |

OTHER PUBLICATIONS

U.S. Appl. No. 10/942,918, filed Sep. 17, 2004, Kumashio.

* cited by examiner

*Primary Examiner*—David K Moore
*Assistant Examiner*—Benjamin O Dulaney
(74) *Attorney, Agent, or Firm*—Oblon, Spivak, McClelland, Maier & Neustadt, L.L.P.

(57) ABSTRACT

A printing system includes a document supervisory client provided in a first computer and configured to generating at least one print condition setting. A document supervisory server provided in a second computer and configured to perform printing based on the print condition settings. The document supervisory client queries the document supervisory server via a network if the print condition settings are appropriate in a printer controlled by the document supervisory server through the network. The document supervisory server returns advisability of the print condition settings to the document supervisory client based on a condition of the printer.

11 Claims, 13 Drawing Sheets

FIG. 6

| | | | | |
|---|---|---|---|---|
| SHEET SIZE | ○ A3 | ○ A4 ● | ○ A5 | ○ B4 | ○ B5 |
| SHEET DIRECTION | ● PORTRAIT | ○ LANDSCAPE | | | |
| DUPLEX | ● NONE | ○ LEFT SIDE BIND | ○ RIGHT SIDE BIND | ○ UPPER SIDE BIND |
| INTEGRATION | ● NONE | ○ 2 IN 1 | ○ 2 IN 12 | | |
| PUNCH | ● NONE | ○ LEFT | ○ RIGHT | ○ UPPER | |
| STAPLE | ● NONE | ○ LEFT UPPER | ○ RIGHT UPPER | ○ LEFT TWO | ~~○ UPPER TWO~~ | ○ RIGHT TWO |

OK    CANCEL

| PRINT SETTING |
|---|
| PAPER = A4 |
| LAYOUT = PORTRAIT |
| DUPLEX = NONE |
| NUP = NONE |
| PUNCH = LEFT |
| STAPLE = NONE |

| INTERMEDIATE PDL |
|---|
| INTERMEDIATE PDL DATA |
| . . . |
| INTERMEDIATE PDL |
| INTERMEDIATE PDL DATA |

FIG. 9

(TABLE 1)

| API FUNCTION | FUNCTION |
|---|---|
| CheckServerPrint | INQUIRY ABOUT CORRESPONDENCE TO SERVER PRINTING |
| GetPrinterFunc | OBTAINING PRINTING FUNCTION |
| SetCommand | SETTING OF PRINT SETTING WHEN COMBINATION IS IMPOSSIBLE TO BE REALIZED, IT IS CHANGED TO POSSIBLE ONE & CHANGED PRINT SETTING IS RETURNED. |
| ChangeCommand | CHANGING CURRENTLY SET VALUE FOR DESIGNATED FUNCTION |
| GetCommand | OBTAINING PRINT SETTING CURRENTLY SET |
| GetFuncValue | OBTAINING POSSIBLE SET VALUES FOR DESIGNATED FUNCTION. WHEN "SET-COMMAND" PRINT SETTING IS SET, RETURNING SET VALUES CHANGEABLE AS FAR AS PRINT SETTING IS KEPT REALIZABLE FOR DESIGNATED FUNCTION. |

FIG. 10

(TABLE 2)

| INQUIRY EXAMPLE | RETURN VALUE |
|---|---|
| CheckServerPrint "Printer a" | TRUE |

FIG. 11

(TABLE 3)

| INQUIRY EXAMPLE | RETURN VALUE (FUNCTION/CHARACTER-STRING) |
|---|---|
| GetPrintFunc "Printer a" | PAPER / SHEET SIZE<br>LAYOUT / SHEET DIRECTION<br>DUPLEX / DUPLEX<br>NUP / INTEGRATION<br>PUNCH / PUNCH<br>STAPLE / STAPLE |

(TABLE 4)

| INQUIRY EXAMPLE | RETURN VALUE (SET VALUE/CHARACTER STRING/GRAPHIC DATA) |
|---|---|
| GetFuncValue "PRINTER a", "PUNCH" | NONE/NONE/<br>LEFT/LEFT/<br>RIGHT/RIGHT/<br>TOP/UPPER/ |

FIG. 13

( TABLE 5 )

| FUNCTION | SET VALUE |
|---|---|
| PAPER | A4, A5, A6, B4, B5 |
| LAYOUT | PORTRAIT, LANDSCAPE |
| DUPLEX | NONE, LEFT, RIGHT, TOP |
| NUP | NONE, 2IN1P1, 2IN1P2 |
| PUNCH | NONE, LEFT, RIGHT, TOP |
| STAPLE | NONE, LEFTTOP, RIGHTTOP, LEFT2, RIGHT2, TOP2 |

FIG. 14

(TABLE 6)
[EXAMPLE] (SETTING OF "UP" TO "PUNCH" IS CORRECTED TO "LEFT")

| SET VALUE | SET VALUE-CORRECTED |
|---|---|
| PAPER = A4 | PAPER = A4 |
| LAYOUT = PORTRAIT | LAYOUT = PORTRAIT |
| DUPLEX = NONE | DUPLEX = NONE |
| NUP = NONE | NUP = NONE |
| PUNCH = UP | PUNCH = LEFT |
| STAPLE = NONE | STAPLE = NONE |

SETTING ERROR AVOIDABLE PRINTING SYSTEM AND METHOD

CROSS REFERENCE TO A RELATED APPLICATION

This application claims priority under 35 USC §119 to Japanese Patent Application No. 2001-011294 filed on Jan. 19, 2001, the entire contents of which being herein incorporated by reference.

BACKGROUND OF THE INVENTION

1. Field of the Invention

The present invention generally relates to printing systems that print a document or the like generated by a terminal apparatus such as a personal computer connected to a network such as a LAN, and more particularly, to printing systems capable of preventing an operator from erroneously setting printing conditions.

2. Discussion of the Background

A document printing system described, for example, in Japanese Patent Application Laid Open No. 2000-298564 enables a printer driver to generate an intermediate file described with a PDL (Page Description Language). In such a system, application software sets and changes prescribed print condition setting to the intermediate file so that print data can receive optional processing. As a result, highly sophisticated printing is enabled.

Further, a number of functions of a printer has increased recently. For example, as described in Japanese Patent Application Laid Open No. 11-143657, not only magnification and integration printings, but also complex printing, such as duplex printing, punching, stabling, etc., have been achieved only by prescribed application software and a printer driver function. However, depending upon a direction of a sheet to be printed, for example, impermissible settings arise due to a physical limitation on the printer such that punching can not be performed at a designated position.

In general, before printing is performed using prescribed application software, a print condition setting user interface is displayed by a printer driver using API (Application Program Interface) or the like provided by an OS (original system). Then, a combination of impermissible settings which are set through the print condition setting user interface is excluded from available options, for example, so that erroneous print condition settings cannot be selected. Then, setting details are stored in a memory, and further sent to the printer driver in order to be printed.

Further, in Japanese Patent Application Laid Open No. 2000-207150, a client apparatus generates a print job including data designating printing a document. A print server is also provided to interpret the print job and generate and provide printable data from the document to a printer, thereby enabling the printer to print. In such a system, a user accesses a document supervisory database, included in the print server, from document supervisory application software which is included in the client apparatus. The user simultaneously makes a query if printable data that constructs the print job is stored. If the printable data is stored, it is read and reused as print designation data.

According to the document printing system described in Japanese Patent Application Laid Open No. 2000-298564, application software can recognize a type of function related to printing and settable from a printer driver, and settable details for the function. However, the inventor of the present invention realized when a prescribed combination of setting details is generated as print condition settings, an inappropriate combination may be created depending upon contents of the combination. In general, only a printer driver which is specialized for a printer can readily determine if such a combination is appropriate. Accordingly, when such a determination system is incorporated in application software, there is a disadvantage if the application software is not specialized for a printer.

Furthermore, a disadvantage may arise, for example, when "landscape" is set as print condition setting for a sheet in a printing apparatus as described in Japanese Patent Application Laid Open No. 11-143657. The inventor of the present invention realized that the disadvantage is that an impermissible setting item, such as punching at an upper side of the sheet, disappears from the print condition setting user interface that preferably displays all the options for confirmation purpose.

In addition, according to the system of Japanese Patent Application Laid Open No. 2000-207150, the printable data is taken in once by the client apparatus and then is transferred to the printer via a network again. However, the inventor of the present invention realized that a disadvantage arises because the load on the network increases and therefore is time consuming. In addition, setting of a printer driver should be performed at each client apparatus.

SUMMARY OF THE INVENTION

Accordingly, an aspect of the present invention is to address and resolve the above and other problems and provide a new printing system. The above and other aspects are achieved according to the present invention by providing a novel printing system including a document supervisory client configured to generate one or more print condition settings, and a document supervisory server configured to perform printing. The document supervisory client may query the document supervisory server to determine if the print condition settings are appropriate. The document supervisory server may respond with regard to advisability of the print condition settings.

In another embodiment, if print condition settings are not appropriate, the document supervisory server may change a combination of print condition settings to provide appropriate print condition settings and send the appropriate print condition settings to the document supervisory client.

In yet another embodiment, a first computer including a document supervisory client may be provided so as to generate one or more print condition settings. A second computer including a document supervisory server may also be provided so as to perform printing. A printer may be connected to a network.

In yet another embodiment, the document supervisory server may send a setting value related to appropriate print condition setting together with character strings and graphs each representing the appropriate print condition setting to the document supervisory client as initial values. The document supervisory client may generate a user interface for providing print condition settings based upon the setting values, character strings, and graphs.

In yet another embodiment, the document supervisory client may include a function of sending an ID which uniquely identifies a document stored in a database which is located in a document supervisory server. In addition, the document supervisory server may obtain an applicable document corresponding to the ID and execute printing.

BRIEF DESCRIPTION OF DRAWINGS

A more complete appreciation of the present invention and many of the attendant advantages thereof will be readily obtained as the same becomes better understood by reference to the following detailed description when considered in connection with the accompanying drawings, wherein:

FIG. 6 is a schematic chart illustrating a display of a print condition setting dialog UI;

FIG. 7 is a schematic chart illustrating a display of a print condition setting dialog UI that is changed;

FIG. 8 is a schematic chart illustrating a configuration of print data transmitted from the document supervisory server;

FIG. 9 is a chart illustrating a first table showing exemplary API functions and functions;

FIG. 10 is a chart illustrating a second table showing exemplary queries and returning values;

FIG. 11 is a chart illustrating a third table also showing exemplary queries and returning values;

FIG. 13 is a chart illustrating a fifth table showing exemplary functions and setting values; and FIG. 14 is a chart illustrating a sixth table showing exemplary setting values and returned setting values.

DETAILED DESCRIPTION OF THE PREFERRED EMBODIMENT

Figure 1:
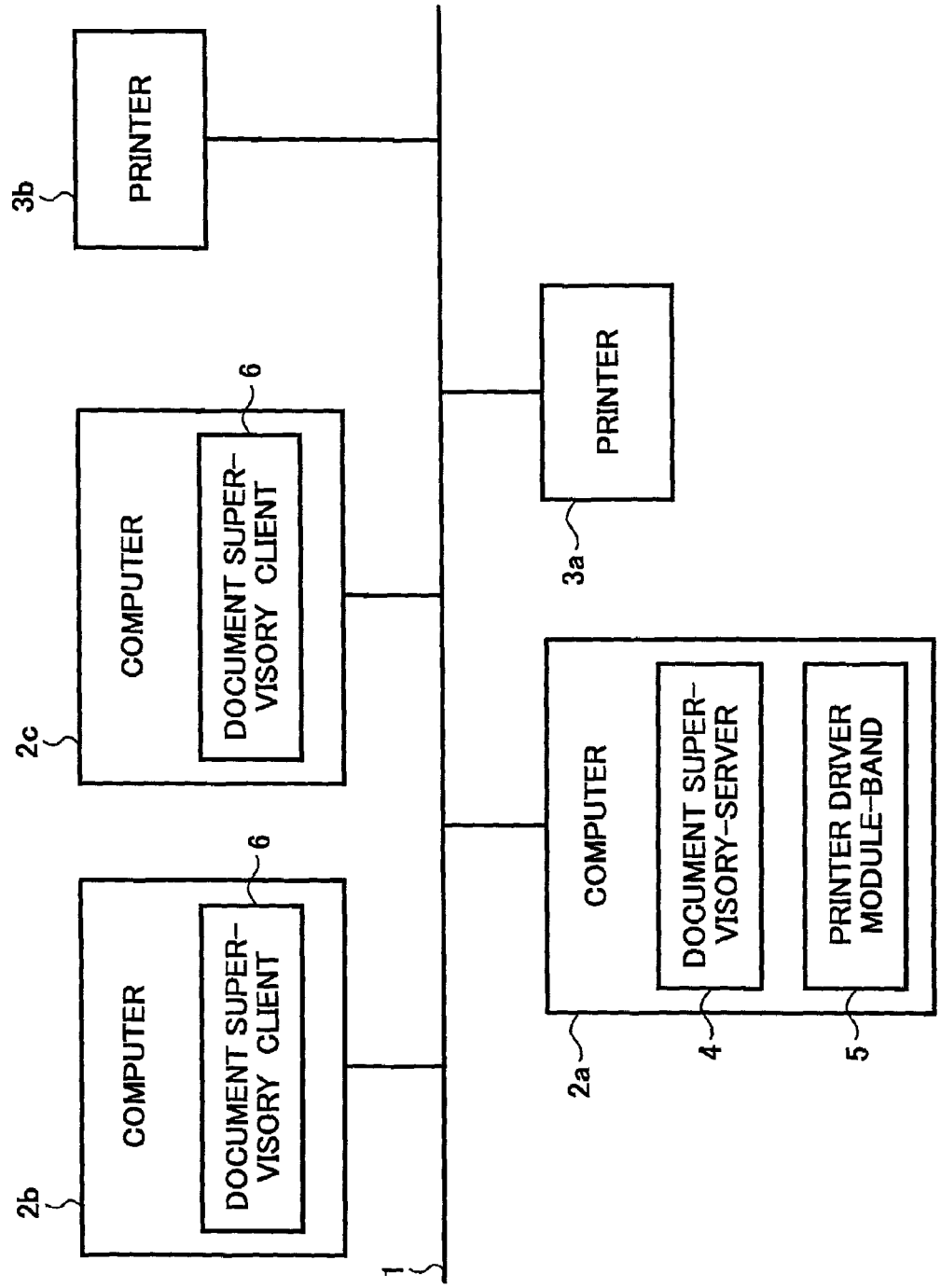
FIG. 1 is a schematic configuration chart illustrating an exemplary embodiment according to the present invention.

Referring now to the drawings, wherein like reference numerals designate identical or corresponding parts throughout several views. In FIG. 1, a printing system may be provided and include a plurality of computers 2a, 2b, 2c and a plurality of printers 3a, 3b, 3c each connected to a network 1, for example, but not limited to a LAN. The computer 2a may include a document supervisory server 4 composed of document supervisory software, and a printer driver module band 5 that generates outputs to the printers 3a and 3b so that perform printing is performed. Each of the computers 2b and 2c may include a document supervisory client 6 including client software that generates print condition settings and accesses the document supervisory server 4 of the computers 2a.

Figure 2:
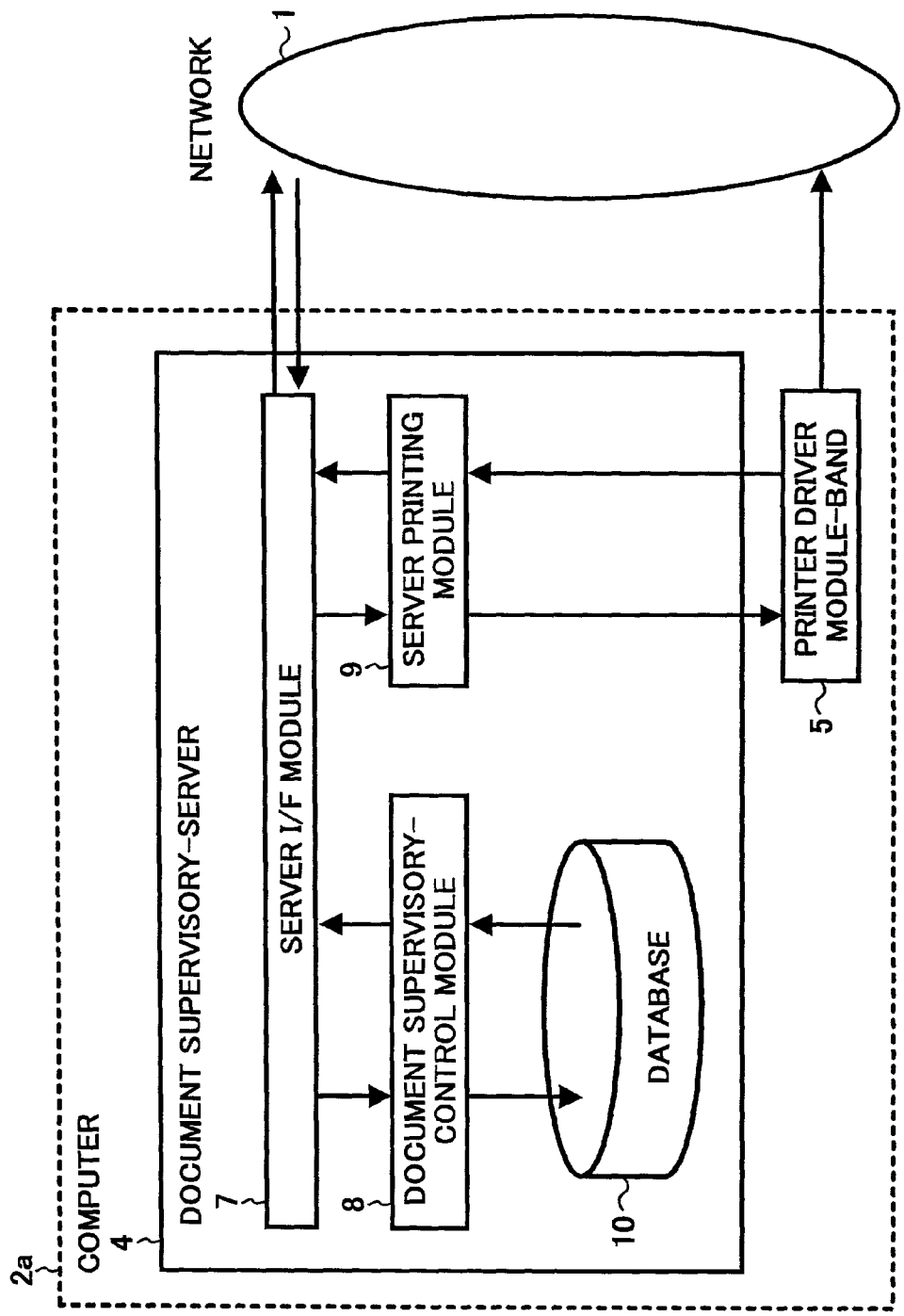
FIG. 2 is a block chart illustrating a configuration of software of a document driver module.

As illustrated in FIG. 2, the document supervisory server 4 may include a server I/F module 7, a document supervisory control module 8, and a server print module 9, in order to execute printing. The server I/F module 7 may perform communication with each of the document supervisory clients 6 of the computers 2b and 2c, illustrated in FIG. 1, via the network 1. Each of the document supervisory clients 6 may perform command setting and data exchanging with both of the document supervisory control module 8 and the server print module 9 via the server I/F module 7. An example in which one server I/F module 7 is provided will be described herein below. However, the server I/F module 7 may be provided in each of the respective document supervisory control module 8 and the server print module 9. The document supervisory control module 8 may access, store a new document, and read a document from the database 10. The server print module 9 may access a printer driver of the printer driver module band 5 and exchange data via an interface of either the printer driver or a standard of an OS. In addition, the server print module 9 may be connected to the document supervisory control module 8 and enabled to access indirectly the database 10.

Figure 3:
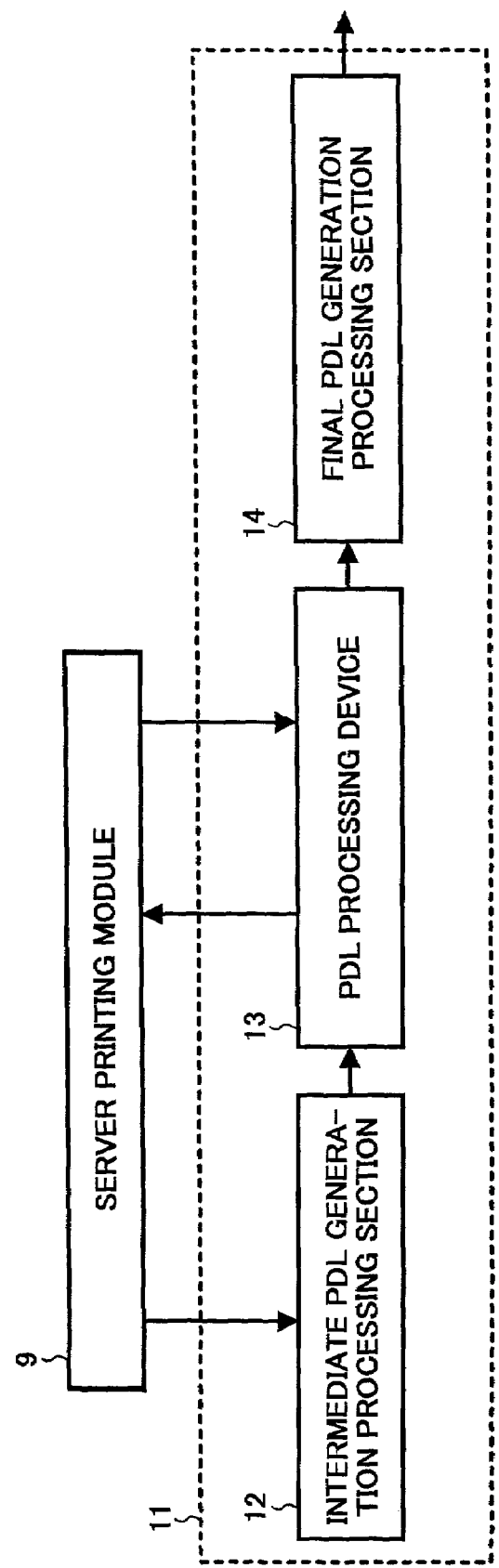
FIG. 3 is a block chart illustrating a configuration of a printer driver module.

Each printer driver module 11 of the printer driver module band 5 may generate an intermediate file described with a PDL. By giving and changing print condition settings to the intermediate file, the printer driver module 11 may enable print data to receive optional processing in accordance with the print condition settings. For example, as illustrated in FIG. 3, the printer driver module 11 may include an intermediate PDL generation processing section 12 that generates an intermediate PDL by a conventional application software or other appropriated means other than a printer driver. A PDL processing device 13 also may be provided so as to transmit the intermediate PDL and receive data to and from the server print module 9. Printer driver module 11 also may include a final PDL generation processing section 14.

Figure 4:
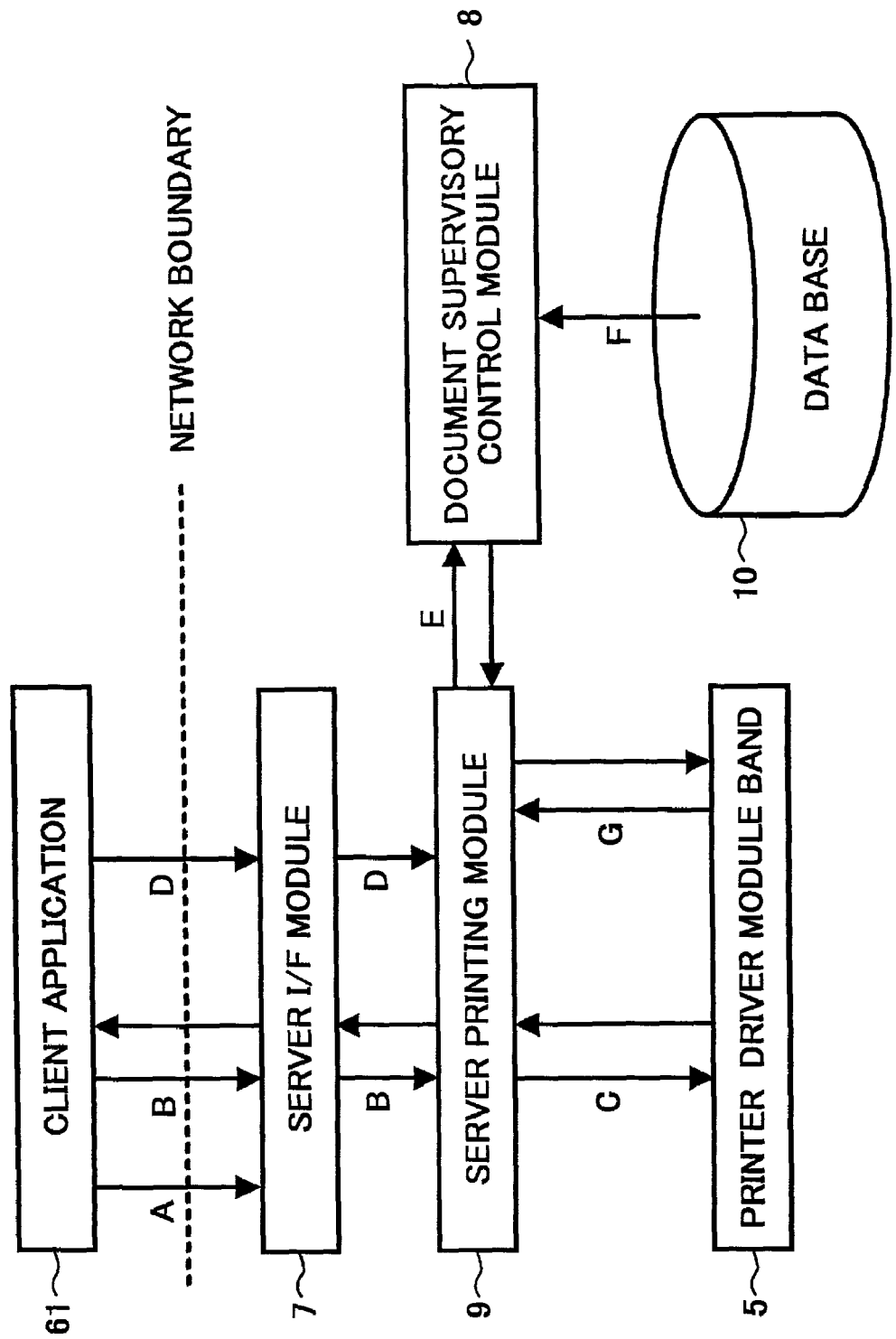
FIG. 4 is a schematic chart illustrating communication between a document supervisory client and a document supervisory server.

FIG. 4 illustrates exemplary communication performed in the printing system, constructed in the above-described manner, between the document supervisory client 6 of the computer 2b and the document supervisory server 4. Client application software 61 may be provided in the document supervisory client 6, and may be initially connected to the server I/F module 7 via the network 1 and a route A. As a connection technology, a DCOM (Distributed Component Object Model) utilized in an OS such as, but not limited to, Microsoft Windows® may be available. Subsequently, the client application software 61 may request the server print module 7 for a list of printer names capable of printing under control of the document supervisory control module 8 or server through route B. As one example, an interface of the printer driver may be provided in the form of API.

The API may be provided as a DLL (Dynamic-Link Library). For example, the DLL file may be installed simultaneously when a printer driver is installed. The server print module 9 may attempt to load a DLL file. When DLL file loading results in failure after attempting, a determination may be made that a printer corresponding to server printing does not exist, and an empty list of the printer names may be returned to the client application software 61. In contrast, when the DLL file is successfully loaded, the entire names installed in the document supervisory server 4 for respective printers are obtained by the client application software 61. Then, the client application software 61 may make a query if the server printing is corresponded using the API function "CheckServerPrint" listed in Table 1 of FIG. 9 in a manner as illustrated in the Table 2 of FIG. 10.

Figure 5:
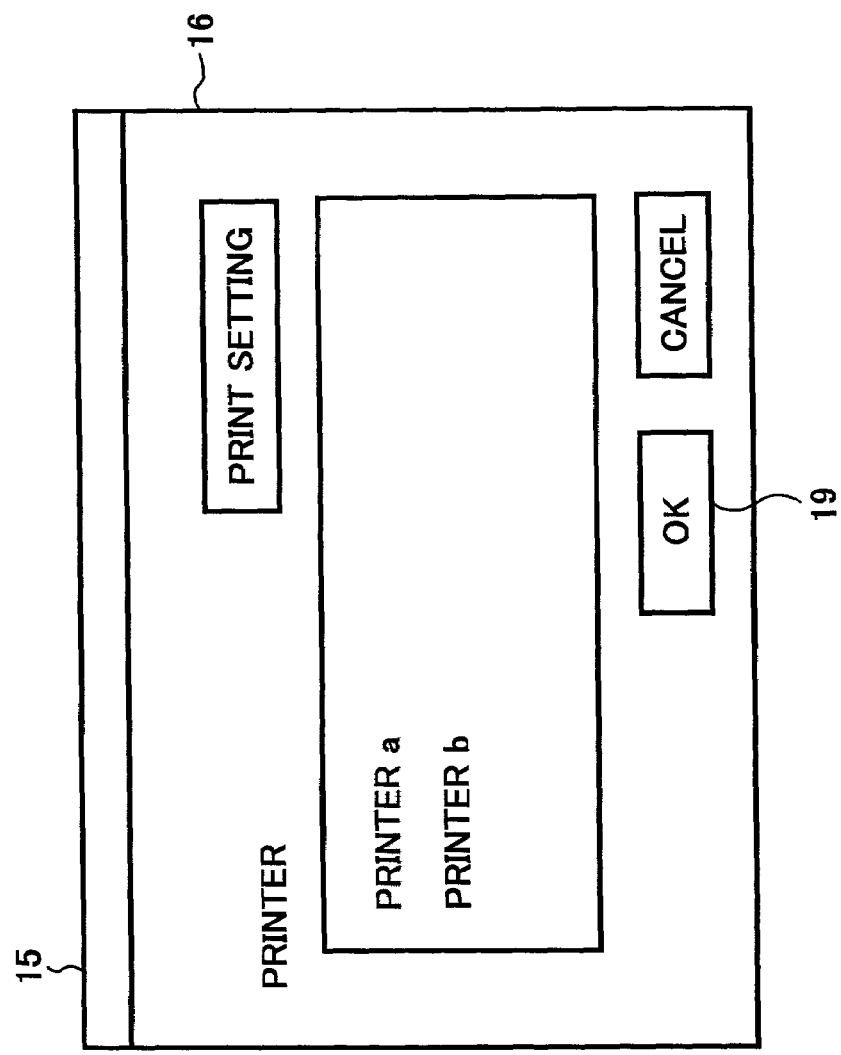
FIG. 5 is a schematic chart illustrating a display of a print dialog UI (User Interface)

In response to the query by the client application software 61, the document supervisory server 4 may return a list including only names identifying printers capable of performing the server printing to the client application software 61. The client application software 61 may then display a print dialog user interface (UI) 15 including the list indicating the printer names as illustrated in FIG. 5. When a user confirms the list provided on the display, selects a prescribed printer, and depresses a print condition setting button 16, the client application software 61 may display a print condition setting dialog UI 17 as illustrated in FIG. 6. To obtain information displayable on the print condition setting dialog UI 17, a query about a kind of a print function settable in the printer may be made through routes "B" and "C". The query may be made, for example, with the API function "GetPrinterFunc" provided by the DLL of the printer driver illustrated in Table 1 of FIG. 9. Then, an API function, such as "PAPER/Sheet-Size", "LAYOUT/sheet-direction", "DUPLEX/Duplex", "NUP/Integration" "PUNCH/Punch", or "STAPLE/Staple" may be obtained as print function information.

Figure 12:
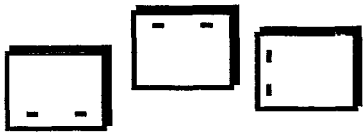
FIG. 12 is a chart illustrating a fourth table showing exemplary queries and returning values.

Also, a query as to the kind of print condition setting values which may be modified or items settable for the print function already obtained may be made via the same routes. For example, as FIG. 12 illustrates in Table 4, a setting value, such as, but not limited to, "NONE", "LEFT", "RIGHT", "UP", etc., may be returned by the application software 61 for the function "PUNCH" together with character strings and graphic data each representing the setting value on the UI.

Further, one or more setting values which may be modified for other functions may be obtained as illustrated in Table 5 of FIG. 13. In the table 5, both of the character strings and graphic data may be omitted.

By obtaining setting values which may be modified, an initial print condition setting value may be generated. A format of the initial print condition setting value may be generated in as a list, for example, PAPER=A4, LAYOUT=PORTRAIT, DUPLEX=NONE, NUP=NONE, PUNCH=NONE, STAPLE=NONE.

An inquiry to determine if optionally set or modified setting values constitute an appropriate combination may be made through the routes B and C of FIG. 4 with API function "SetCommand." When a determination that the optionally set setting values are not an appropriate combination, a correction may be made to provide an appropriate combination as illustrated in Table 6 of FIG. 14. For example, a printer driver may determine the appropriate combination via a table representing appropriate combinations. Also, any of the setting values may be interrelated such that they may effect the ability to modify other setting values. For example, a setting value "UP" set for the function "PUNCH," affect the setting values for the function "PAPER" and the setting value "LANDSCAPE" for the function "LAYOUT." For example, if "UP" is set then "LANDSCAPE" should be set for the function "LAYOUT". However, if the setting value "PORTRAIT" is set for the function "LAYOUT", a determination or advisability may be made that such print condition settings are inappropriate.

A change may be then executed on at least one setting value. For example, simultaneously, an operation such as changing "UP" to "LEFT" may be performed for the "PUNCH" by referring to Table 6 of FIG. 14, therefore providing appropriate setting values.

A determination or advisability of which setting value to change, may be based on a priority order of the function. Information related to the priority order may be previously stored with the above-described table 6 of FIG. 14 representing the appropriate setting combination. For example, information related to a method for determining the priority and the appropriate setting combinations may be included in a printer driver. Such information may be included when the printer driver is designed.

Further more, determining that one or more setting values which may be changeable from currently set print condition setting values and that an appropriate selection is maintained, may be queried through the routes B and C of FIG. 4, for example, using the API function "GetFuncValue". In response to the query, since the print condition setting value has already been set when the API function "SetCommand" is sent, at least one appropriate setting value may be returned in response thereto. For example, the appropriate setting values of "NONE", "LEFT", and "RIGHT" may be returned for the function "PUNCH", and therefore provided as setting values which may be selected. In other words, the previously returned "UP" may not be returned. In this way, one or more setting values which may be modified for a function may be obtained. Then, based upon obtained information, the print condition setting dialog UI 17 of FIG. 6 may be displayed. In the print condition setting dialog UI 17, the appropriate print condition settings previously selected may be maintained as initial setting values as shown by a black circle in FIG. 6. In addition, setting values not appropriate either may be erased with double lines or may be entirely erased so that a user can not select.

Figure 7:
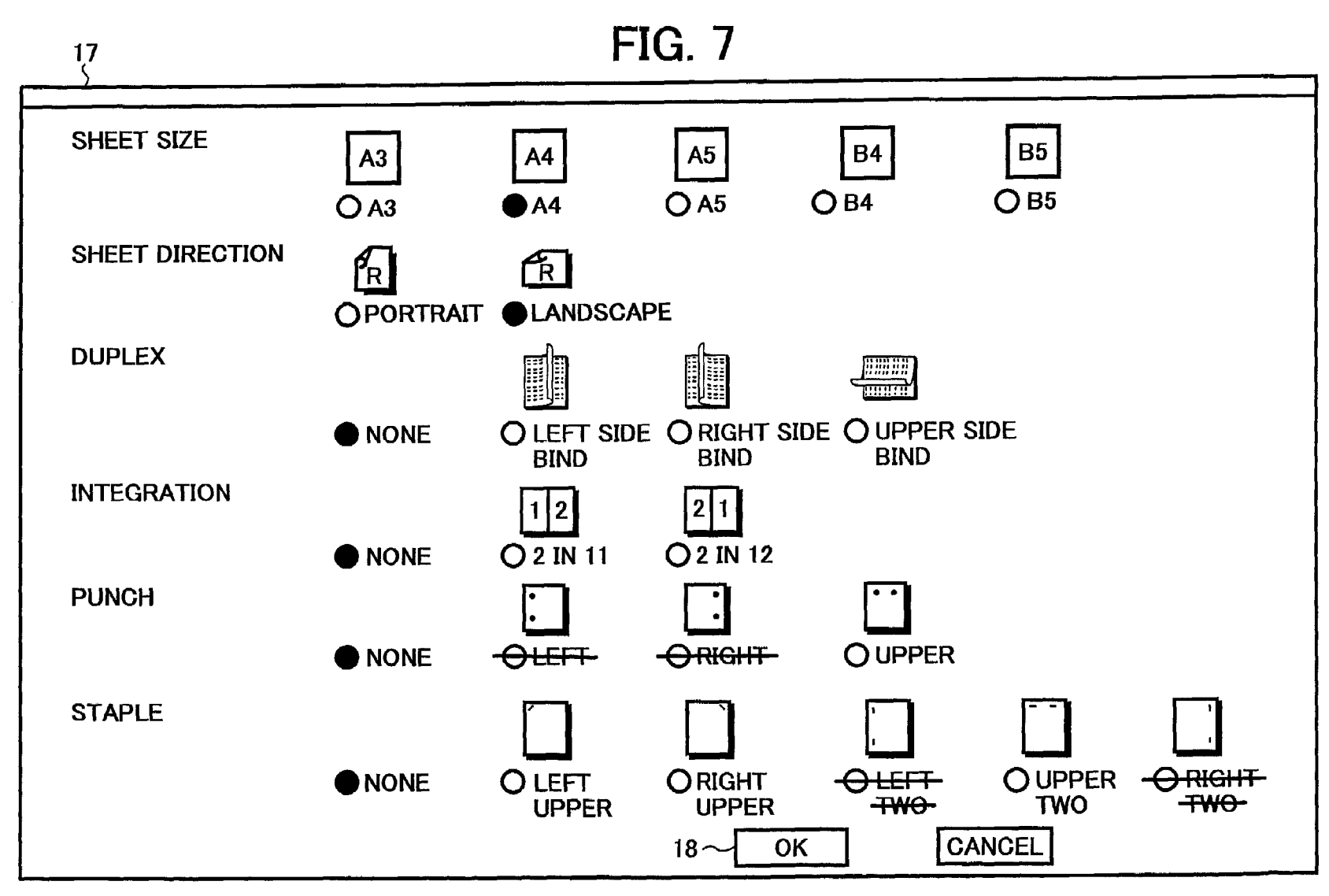

As illustrated in FIG. 7, when a user has confirmed the list provided on the display and changes in the setting values, the display of the print condition setting dialog UI 17 may be updated and changeable setting values for the functions may be obtained again. For example, by selecting "landscape" for "Sheet Direction", the user may be then allowed to change a setting value such as "punch", "Staple", etc. By changing print condition setting in this way, and activating an "OK" button 18 on the print condition setting dialog UI 17, the print condition settings may be confined and reset.

When print execution is designated after the "OK" button 19 is activated, the client application software 6 may transfer both a document ID for identifying a document which is designated for printing and a print condition setting that is set to the server print module 9 through route D of FIG. 4. The server print module 9 may obtain document data from the database 10 through routes "E" and "F" while indicating the document ID. The document data thus obtained may be transmitted to the printer driver module band 5 through a route G. The printer driver module band 5 may then process the document data and generate an intermediate PDL. The printer driver module band 5 may send the intermediate PDL to the server print module 9. Multiple intermediate PDLs may be generated when there exists a plurality of printing objective data. The server print module 9 may generate and send again the data 20 illustrated in FIG. 8 by merging the print condition setting with the intermediate PDL to the printer driver module band 5. The printer driver module band 5 may generate a final PDL based upon the data and indicate printing by carrying the data to a print spooler (not shown).

The mechanisms and processes set forth in the present invention may be implemented using one or more conventional general purpose microprocessors and/or signal processors programmed according to the teachings in the present specification and is appreciated by those skilled in the relevant arts. Appropriate software coding may be prepared readily by skilled programmers based on the teachings of the present disclosure and is apparent to those skilled in the relevant arts. However, as readily apparent to those skilled in the art, the present invention also may be implemented by the preparation of application-specific integrated circuits by interconnecting an appropriate network of conventional component circuits or by a combination thereof with one or more conventional general purpose microprocessors and/or signal processors programmed accordingly. The present invention may also include a computer-based product which may be hosted on a storage medium and includes, but is not limited to, any type of disk including floppy disks, optical disks, CD-ROMs, magnet-optical disks, ROMs, RAMS, EPROMs, EEPROMs, flash memory, magnetic or optical cards, or any type of media suitable for storing electronic instructions.

Numerous additional modifications and variations of the present invention are possible in light of the above teachings. It is therefore to be understood that within the scope of the appended claims, the present invention may be practiced otherwise than as specifically described herein.

What is claimed as new and desired to be secured by Letter Patent of the United States is:

1. A printing system having at least one printer, comprising:
   a document supervisory client configured to generate print condition settings, the print condition settings including a first setting including first information and a second setting including second information; and
   a document supervisory server configured to control printing based upon a printing request from the document supervisory client in accordance with the first and second settings,
   wherein said document supervisory client is configured to make a query to the document supervisory server via a network inquiring whether the first and second settings are permissible, in combination, in a printer, and said document supervisory server is further configured to return advisability of the first and second settings to the document supervisory client,
   said document supervisory server is configured to change one of the first and second settings to a third setting including third information and to send the third setting and an unchanged one of the first and second settings to the document supervisory client upon determining that the first and second settings are impermissible in combination with each other, and the document supervisory server is further configured to determine which of the first and second settings to change based on a priority order previously stored in the supervisory server,
   said document supervisory client is configured to generate a user interface based on the third setting and the unchanged one of the first and second settings, and the user interface displays print conditions that are impermissible with a visual indication that identifies the print conditions as impermissible,
   the one of the first and second settings changed by said document supervisory server is a setting that was set by the document supervisory client, and
   the first, second, and third information each specify at least one of a function of the at least one printer or a characteristic of a medium on which the printer operates.

2. The printing system according to claim 1, wherein said document supervisory server sends initial setting values with applicable character strings and graphs each representing print condition settings to the document supervisory client, and said document supervisory client generates a user interface configured to allow print condition settings based upon the setting values, character strings, and graphs.

3. The printing system according to claim 2, wherein, said document supervisory client is configured to send an ID which uniquely identifies a document stored in a database in a document supervisory server, and said document supervisory server obtains an applicable document corresponding to the ID and executes printing the applicable document in accordance with the print condition settings.

4. The printing system according to claim 1, wherein the visual indication is a listing of the print condition with a strike-through marking.

5. A printing system comprising:
   at least one printer connected to a network;
   a first computer including a document supervisory client configured to generate print condition settings, the print condition settings including a first setting including first information and a second setting including second information and to make a query to a document supervisory server via the network inquiring whether the first and second settings are permissible, in combination, in one of said at least one printer;
   a second computer including a document supervisory server configured to perform printing based upon a printing request from the document supervisory client in accordance with the print condition settings and to return advisability of the first and second settings, in combination, to the document supervisory client and to change one of the first and second settings to a third setting including third information and send the third setting and an unchanged one of the first and second settings to the document supervisory client upon determining the first and second settings are impermissible in combination with each other, the document supervisory server is further configured to determine which of the first and second settings to change based on a priority order previously stored in the second computer, wherein
   said document supervisory client generates a user interface based on the third setting and the unchanged one of the first and second settings, and the user interface displays print conditions that are impermissible with a visual indication that identifies the print conditions as impermissible,
   the one of the first and second settings changed by said document supervisory server is a setting that was set by the document supervisory client, and
   the first, second, and third information each specify at least one of a function of the at least one printer or a characteristic of a medium on which the printer operates.

6. The printing system according to claim 5, wherein said document supervisory server sends initial setting values with applicable character strings and graphs each representing print condition settings to the document supervisory client, and said document supervisory client generates a user interface configured to allow print condition settings based upon the setting values, character strings, and graphs.

7. The printing system according to claim 5, wherein, said document supervisory client is configured to send an ID which uniquely identifies a document stored in a database in a document supervisory server, and said document supervisory server obtains an applicable document corresponding to the ID and executes printing the applicable document in accordance with the print condition settings.

8. The printing system according to claim 6, wherein, said document supervisory client is configured to send an ID which uniquely identifies a document stored in a database in a document supervisory server, and said document supervisory server obtains an applicable document corresponding to the ID and executes printing the applicable document in accordance with the print condition settings.

9. A printing method comprising:
   generating prescribed print condition settings in a first computer, the prescribed print condition settings including a first setting including first information and a second setting including second information;
   transmitting a query to a second computer via a network inquiring whether the first and second settings are permissible, in combination with each other, in a printer connected to the network;
   returning advisability of the first and second settings from the second computer to the first computer; and performing printing in accordance with the advisability;

determining if the first and second settings are permissible, in combination with each other, in the printer;

upon determining that the first and second settings are not permissible, further determining, based on a priority order previously stored in the second computer, which of the first and second settings to change;

changing, in the second computer, one of the first and second settings to a third setting including third information when the first and second settings are determined to be impermissible, in combination with each other; and sending the third setting and the unchanged one of the first and second settings to the first computer, wherein said first computer generates a user interface based on the third setting and the unchanged one of the first and second settings, and the user interface displays print conditions that are impermissible with a visual indication that identifies the print conditions as impermissible, the one of the first and second settings changed by the second computer is a setting that was set by the first computer, and the first, second, and third information each specify at least one of a function of the at least one printer or a characteristic of a medium on which the printer operates.

10. The printing method according to claim 9, further comprising:

sending all of setting values related to the printer as permissible print condition settings, applicable character strings, and graphs representing initial print condition settings to the first computer; and generating the user interface configured to allow modification of print condition settings based upon the setting values, character strings, and graphs.

11. The printing method according to claim 10, further comprising:

sending an ID from the first computer to the second computer via the network, said ID uniquely identifies a document;

obtaining the document corresponding to the ID; and executing printing the document based on the print condition settings.

* * * * *